(12) United States Patent
Waugh (10) Patent No.: US 6,449,117 B1
(45) Date of Patent: Sep. 10, 2002

(54) REDUCING ACOUSTIC NOISE USING A CURRENT PROFILE DURING INITIAL STAGES OF A DISC DRIVE SEEK

(75) Inventor: David C. Waugh, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/352,186

(22) Filed: Jul. 12, 1999

Related U.S. Application Data
(60) Provisional application No. 60/092,638, filed on Jul. 13, 1998.

(51) Int. Cl.[7] ............................................. G11B 5/596
(52) U.S. Cl. ............................... 360/78.07; 360/78.14; 318/696
(58) Field of Search ......................... 360/78.04, 78.09, 360/78.07, 78.14; 318/696

(56) References Cited

U.S. PATENT DOCUMENTS

| | | |
|---|---|---|
| 3,883,894 A | 5/1975 | Johnson |
| 4,333,117 A | 6/1982 | Johnson |
| 4,622,604 A | 11/1986 | Hashimoto et al. |
| 4,638,230 A | 1/1987 | Lee |
| 4,677,507 A | 6/1987 | Elliott |
| 4,907,109 A | 3/1990 | Seniō |
| 4,931,889 A | 6/1990 | Osafune |
| 4,937,689 A | 6/1990 | Seaver et al. |
| 4,956,831 A | 9/1990 | Sarraf et al. |
| 4,965,501 A | 10/1990 | Hashimoto |
| 5,095,471 A | 3/1992 | Sidman |
| 5,151,639 A | 9/1992 | Hasegawa et al. |
| 5,182,684 A | 1/1993 | Thomas et al. |
| 5,233,486 A | 8/1993 | Albert |
| 5,381,282 A | 1/1995 | Arai et al. |
| 5,465,034 A | 11/1995 | Andrews, Jr. et al. |
| 5,465,035 A | 11/1995 | Scaramuzzo, Jr. et al. |
| 5,475,545 A | 12/1995 | Hampshire et al. |
| 5,657,179 A | 8/1997 | McKenzie |
| 5,659,438 A | 8/1997 | Sasamoto et al. |
| 5,680,272 A | 10/1997 | Kadlec et al. |
| 5,696,647 A | 12/1997 | Phan et al. |
| 5,847,895 A | 12/1998 | Romano et al. |
| 6,166,876 A * | 12/2000 | Liu .......................... 360/78.04 |
| 6,178,060 B1 * | 1/2001 | Liu .......................... 360/78.07 |

FOREIGN PATENT DOCUMENTS

| | | |
|---|---|---|
| EP | 0 717 399 A2 | 6/1996 |
| WO | WO 90/13113 | 11/1990 |

* cited by examiner

Primary Examiner—Andrew L. Sniezek
(74) Attorney, Agent, or Firm—Crowe & Dunlevy (57) ABSTRACT

Apparatus and method for reducing the generation of acoustic noise in a disc drive. A seek is carried out to move a head from an initial track to a destination track on a corresponding disc surface using a servo circuit which outputs a series of current command values indicative of successive magnitudes of current to be applied to an actuator motor. A velocity profile provides a sequence of demand velocities indicative of the desired velocity at each of a succession of time periods during the seek. Closed loop velocity control is achieved by comparing the actual velocity of the head to the corresponding demand velocity and adjusting the current in relation to the velocity error therebetween. During initial stages of the seek, however, open loop control is initially performed using a current profile table which shapes the initial stages of current to a desired waveform, irrespective of the velocity profile and the velocity error.

14 Claims, 4 Drawing Sheets

REDUCING ACOUSTIC NOISE USING A CURRENT PROFILE DURING INITIAL STAGES OF A DISC DRIVE SEEK

RELATED APPLICATIONS

This application claims the benefit of U.S. Provisional Application No. 60/092,638 entitled METHOD TO REDUCE ACOUSTIC NOISE, filed Jul. 13, 1998.

FIELD OF THE INVENTION

This invention relates generally to the field of disc drive data storage devices, and more particularly, but not by way of limitation, to an apparatus and method for reducing the generation of acoustic noise during initial stages of a seek operation wherein a head is moved from an initial track to a destination track.

BACKGROUND

A disc drive is a data storage device used to store and retrieve computerized data in a fast and efficient manner. A typical disc drive comprises one or more rigid discs that are coated with a magnetizable medium and mounted on the hub of a spindle motor for rotation at a constant high speed. The data are stored on the discs in a plurality of concentric circular tracks by an array of transducers ("heads") mounted to a radial actuator for movement of the heads relative to the discs. The heads are supported over the corresponding disc surfaces by air bearings set up by the rotation of the discs and are controllably moved by an actuator motor, such as a voice coil motor (VCM).

A problem that has received a great deal of attention in the disc drive industry is the generation of undesired acoustic noise as the heads are moved from one track to another (referred to as a "seek operation"). To maximize data transfer performance, efforts are made to minimize the time required for a seek so that the disc drive can proceed to transfer data to or from the destination track. The application of large amounts of current to the actuator motor to initially accelerate and then decelerate the head results in fast head movement to the destination track, but can also undesirably set up vibrations in the disc drive housing which can be annoying to a computer user, as well as detrimental to the operation of adjacent drives in multi-drive applications.

Accordingly, efforts have been made in the prior art to reduce the rate at which current is initially applied to an actuator motor to reduce the generation of unwanted acoustic noise. For example, U.S. Pat. No. 5,475,545 issued to Hampshire et al. and assigned to the assignee of the present invention, discloses a servo circuit which is used to control the position of heads of a disc drive using a modified velocity-controlled approach.

In a standard velocity-controlled seek, a velocity profile, indicative of a desired velocity trajectory for the head, is selected based on the distance between the initial and destination tracks. The head is first accelerated to a maximum velocity through the application of a large magnitude of current to the coil. The head then is maintained at this maximum velocity until the head reaches a predetermined distance from the destination track, at which point a large amount of current of opposite polarity is applied to the coil to decelerate and settle the head onto the destination track. Adjustments in the velocity of the head are repetitively made during the seek in relation to the difference between the actual velocity and the velocity profile. The desired velocity at any given point during the seek is referred to as a demand velocity, with the velocity profile comprising a series of demand velocity values.

At the beginning of the seek, the actual velocity of the head is substantially zero, whereas the velocity profile requires a demand velocity of substantially maximum velocity. This results in a large velocity error, and the servo circuit responds by applying the maximum available current to the coil, resulting in quick acceleration, but also large amounts of vibration. Accordingly, the Hampshire U.S. Pat. No. 5,475,545 reference modifies initial portions of the velocity profile by providing an initial demand velocity of zero and then incrementing the demand velocity during each of a succession of time periods by a fraction value until the maximum demand velocity is reached. In this way, the velocity errors at initial stages of the seek are reduced and the current is more gradually applied to the VCM until the maximum velocity is reached. By selecting an appropriate fraction value, the seek can still be carried out in a short amount of time, but with a substantial reduction in acoustic noise.

U.S. Pat. No. 5,657,179 issued to McKenzie et al. and assigned to the assignee of the present invention, provides an improvement over the Hampshire U.S. Pat. No. 5,475,545 reference by using a velocity demand fraction value that is varied during the initial portions of the seek, thus allowing further tailoring of the resulting current that is applied to the VCM. The use of a variable demand fraction value allows additional tailoring of the current to obtain optimal results.

U.S. Pat. No. 4,965,501, issued to Hashimoto, discloses a different approach to reducing noise at initial stages of a seek. Instead of reducing the initial demand velocities as taught by the aforementioned references, the Hashimoto U.S. Pat. No. 4,965,501 initiates a seek by determining a large velocity error and generating a large initial current command (as with the standard velocity-controlled approach), but then sets an output servo gain block to a very low level and successively increments the gain to gradually apply more current to the VCM until the maximum velocity is reached.

It will be noted that a tradeoff must be made between performing the seek in as quickly a manner as possible and reducing the generation of acoustic noise during the seek. The foregoing references provide different methodologies to tailor the initial application of current to arrive at an acceptable compromise, and have been found operative in the art.

Nevertheless, there are drawbacks associated with these and other prior art approaches. For example, adjusting the demand velocity as taught by the Hampshire and McKenzie references adds additional complexity to the servo circuit design (usually programming carried out by a servo processor, such as a digital signal processor). With continued increases in track densities, ever greater demands are placed on the ability of servo processors to provide robust servo performance; thus, the additional processing overhead required to implement the techniques of the Hampshire and McKenzie can be difficult to accommodate.

Likewise, while Hashimoto presents an operative solution, continually adjusting the output servo gain can also require additional processing steps, especially when the optimum servo gain for a particular head can vary at different locations across the disc. Hence, it can also be difficult to specifically vary the servo gain to effect initial stages of a seek and then ensure that the final gain is appropriate for operation once the head reaches the destination track.

Accordingly, there is a continued need for improvements in the art whereby seeks can be carried out in a manner which reduces the generation of acoustic noise, without requiring complex operations or the adjustment of various servo parameters, such as the velocity profile or the servo gain. It is to such improvements that the present invention is directed.

SUMMARY OF THE INVENTION

The present invention is directed to an apparatus and method for reducing the generation of undesired acoustic noise during a disc drive seek operation.

In accordance with preferred embodiments, a disc drive includes a rotatable disc with a recording surface on which a plurality of tracks are defined and an actuator which supports a head adjacent the tracks. The head is moved through application of current to a coil of a voice coil motor (VCM).

A seek is carried out to move the head from an initial track to a destination track on a corresponding disc surface using a servo circuit which outputs a series of current command values indicative of successive magnitudes of current to be applied to the VCM. A velocity profile provides a sequence of demand velocities indicative of the desired velocity at each of a succession of time periods during the seek. Closed loop velocity control is achieved by comparing the actual velocity of the head to the corresponding demand velocity and adjusting the current in relation to the velocity error therebetween.

During initial stages of the seek, however, open loop control is initially performed using a current profile table which shapes the initial stages of current to a desired waveform, irrespective of the velocity profile and the velocity error. The waveform is selected to reduce excitation of mechanical resonances in the disc drive and is applied to the coil regardless of the location of the initial track.

These and various other features and advantages which characterize the present invention will be apparent from a reading of the following detailed description and a review of the associated drawings.

DETAILED DESCRIPTION

Figure 1:
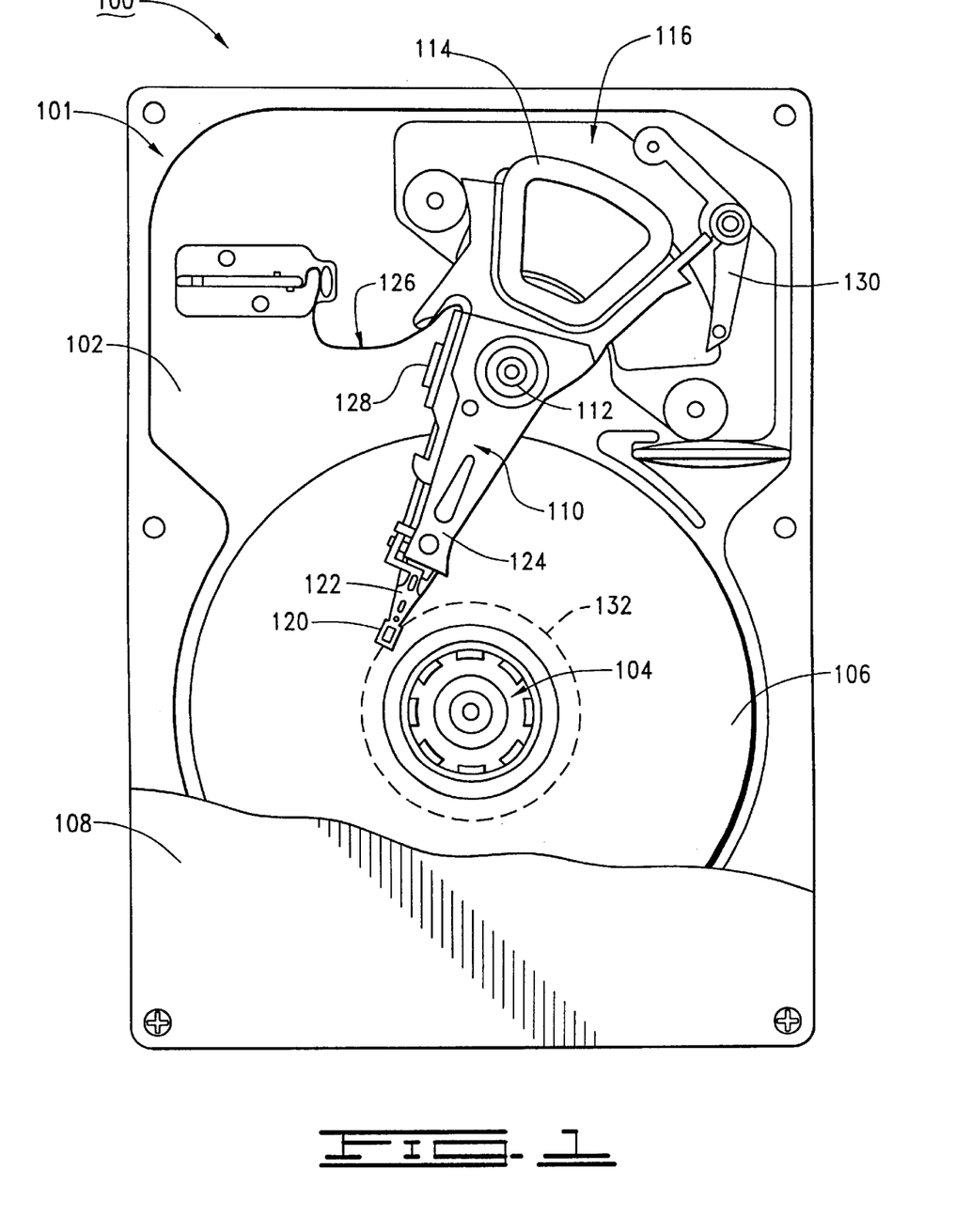
FIG. 1 provides a top plan view of a disc drive constructed in accordance with preferred embodiments of the present invention.

In order to set forth a detailed description of various presently preferred embodiments of the present invention, reference is first made to FIG. 1 which shows a top plan view of a disc drive 100 used to store computer data. The disc drive 100 includes a head-disc assembly (HDA) 101 and a printed wiring assembly (PWA) supporting control electronics used by the disc drive 100. The PWA is mounted to the underside of the HDA 101 and hence, is not visible in FIG. 1.

The HDA 101 includes a base deck 102 which supports a spindle motor 104 used to rotate a plurality of discs 106 at a constant high speed. A series of concentric tracks are defined on each of the disc surfaces using servo data written to the disc drive 100 during manufacturing in a conventional manner. A disc clamp (not designated) secures the discs 106 and a series of disc spacers disposed between adjacent discs to the spindle motor 104. A top cover 108, shown in partial cutaway fashion, mates with the base deck 102 to provide an internal environment for the HDA 101.

A rotary actuator 110 is configured for rotation about a cartridge bearing assembly 112 supported by the base deck 102. The actuator 110 is rotated through controlled application of current to an actuator coil 114 of a voice coil motor (VCM) 116 having a pair of opposing permanent magnets, one of which is shown at 118. The current establishes a magnetic field which interacts with the magnetic field of the permanent magnets 118 to rotate the actuator 110.

A plurality of heads 120 are supported by the actuator 110 over each of the disc surfaces by corresponding flexible suspension assemblies 122, which in turn are supported by rigid actuator arms 124 which project from the body of the actuator 110. Electronic read and write signals are passed from the heads 120 to the aforementioned disc drive PWA using a flex circuit assembly 126 which includes a preamplifier/driver circuit 128 mounted to the side of the actuator 110 as shown. A magnetic inertial latch 130 secures the heads 120 over texturized landing zones 132 on the disc surfaces when the disc drive 100 is deactivated.

Figure 2:
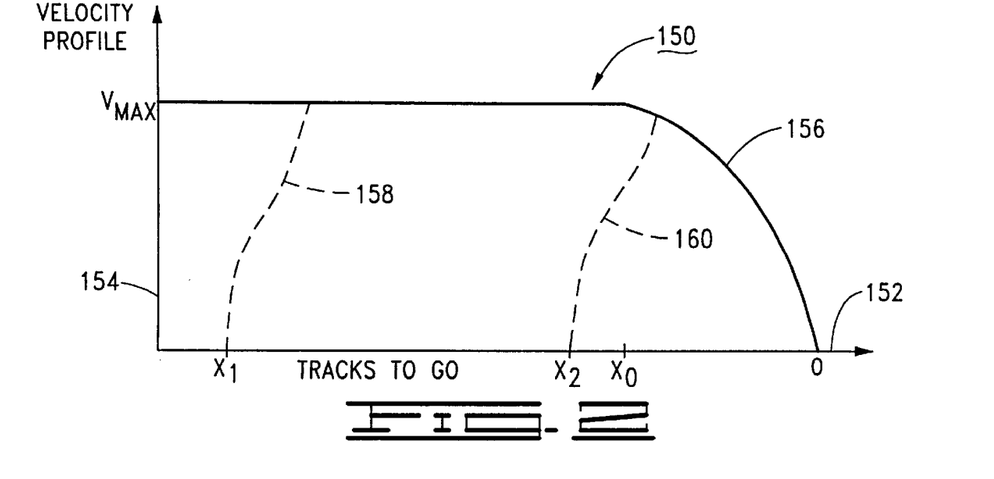
FIG. 2 illustrates a velocity profile for the disc drive, indicative of a series of demand velocities which make up a desired trajectory of the selected head as the head approaches a destination track.

Servo circuitry on the disc drive PWA operates to apply current to the actuator coil 114 to move a selected head 120 from one track to another during a seek operation. To this end, a velocity profile is generated to define the desired velocity trajectory during the seek. FIG. 2 provides a graphical representation of a velocity profile curve 150, plotted against an x-axis 152 and a y-axis 154. The x-axis 152 indicates position with respect to the disc 106, in terms of the number of "tracks to go" until a destination track "0" is reached. It will be readily understood that each track has a unique numeric track address, so that the designation of the destination track as "track 0" is not the same thing as, or indicative of the actual address of the track; rather, each track becomes "track 0" at such time that it is identified as the destination track during a particular seek. The y-axis 154 indicates demand velocity ($V_{DEM}$) which is the desired, or target, velocity for the head 120 at various points during the seek.

The velocity profile 150 has a deceleration portion 156, which begins with a demand velocity of $V_{MAX}$ at track $X_D$ and decreases to a demand velocity of 0 at track 0. The track $X_D$ is a predetermined number of tracks from track 0. The deceleration portion 156 is generally selected in relation to the maximum current that can be applied by the disc drive 100 to decelerate the head 120 to reach the destination track. It will be understood that a faster deceleration rate will result in a shorter seek time, so efforts are made to decelerate the heads as quickly as possible while still providing adequate margin to account for variations in operational characteristics of the drive.

The velocity profile 150 is used as follows. Seeks that begin from initial tracks that are a substantial distance from the destination track 0, such as the seek represented in FIG. 3 as beginning at track $X_1$, are initially accelerated toward the destination track 0 as a result of the application of current to the actuator coil 114 by coil driver circuitry (not shown). This current results in acceleration of the head 120 along trajectory portion 158 until the maximum demand velocity $V_{MAX}$ is reached. The shaping of initial portions of this accelerating current in accordance with preferred embodiments will be discussed in greater detail below.

Once the head 120 attains the maximum velocity $V_{MAX}$, very little current is required to maintain the head at this velocity, so the current is dropped back to a value near zero until the head 120 reaches track $X_D$. At this point, a large amount of current of opposite polarity is applied to the actuator coil 114 to decelerate the head 120 along the deceleration portion 156 until the head 120 is settled onto the destination track 0.

A similar process is used for velocity controlled seeks from tracks closer to the destination track 0, such as from track $X_2$; in this case, current is again applied to the coil 114 to accelerate the head 120 (as indicated by acceleration portion 160) until the deceleration portion 166 is reached, after which current of opposite polarity is applied to bring the head 120 to rest over the destination track 0. Unlike the previous seek, however, the head 120 does not reach and coast at the maximum velocity $V_{DEM}$ before the deceleration phase is initiated.

For reference, it will be noted that the above described velocity controlled seek process is carried out for seeks having a relatively long length. Below a certain length (such as 100 tracks), it has been found more efficient to employ a position controlled approach to move the head 120 to the destination track 0. As will be recognized by those skilled in the art, such positional control uses a reference position (i.e., the location of the destination track), rather than a velocity profile, to control the movement of the head 120 to the desired final location.

Figure 3:
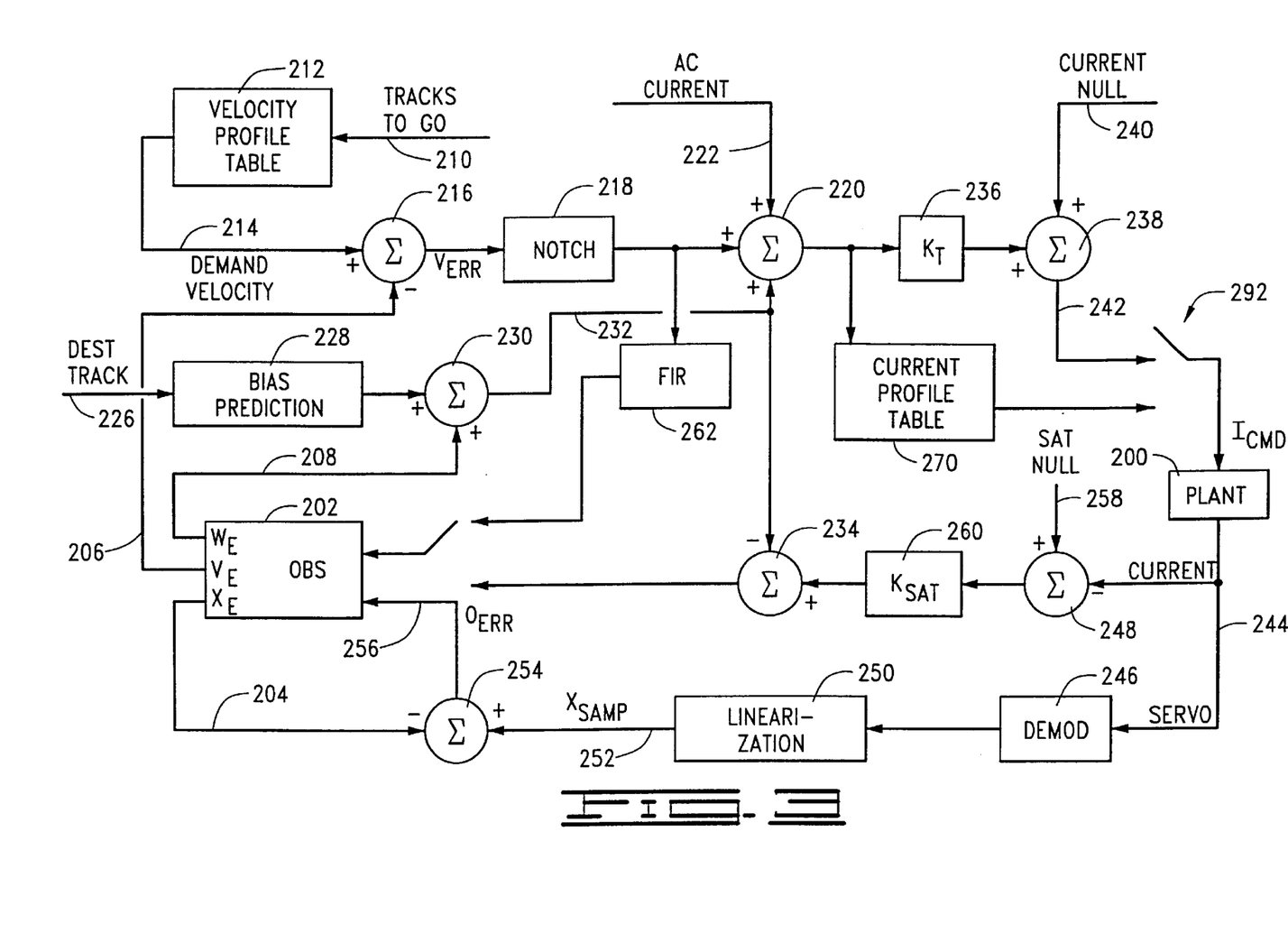
FIG. 3 provides a control diagram of a servo circuit of the disc drive, indicative of programming steps carried out by a servo processor, such as a digital signal processor (DSP) in accordance with preferred embodiments of the present invention.
Figure 4:
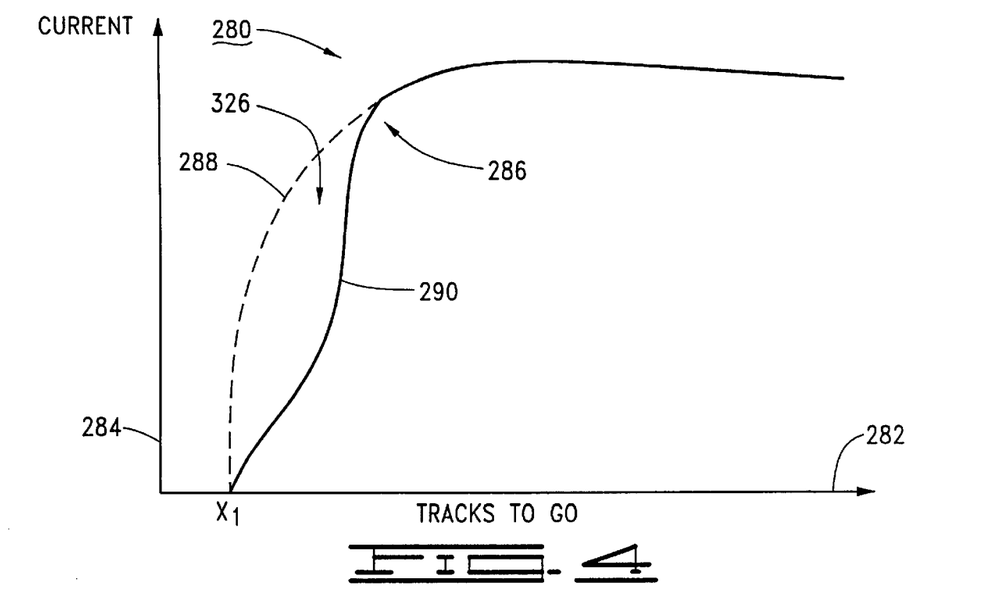
FIG. 4 illustrates a corresponding current profile indicative of current that is initially applied to the actuator coil to cause the head to follow the velocity profile of FIG. 2.

FIGS. 3 and 4 have been provided to illustrate the manner in which the servo circuitry of the disc drive 100 operates to shape the current applied to the actuator coil 114 during initial stages of a seek. Beginning with FIG. 3, shown therein is a control diagram representative of programming stored in memory and utilized by a servo processor, such as a digital signal processor (DSP), used to control the operation of the servo circuitry. It will be understood that the control diagram is a sampled digital system, which operates over a succession of time periods at a selected operational frequency.

Initially, FIG. 3 shows a plant block 200, representative of electrical and mechanical portions of the disc drive 100 including the coil 114 and the head 120. An observer (OBS) 202, configured to provide a mathematical model of the operation of the plant 200, outputs estimates of head position, velocity and bias ($X_E$, $V_E$ and $W_E$) on respective paths 204, 206 and 208. Bias is representative of forces that tend to move the head 120 off-track, such as windage effects from the air currents established by the rotation of the discs 106 and spring forces from the flex circuit assembly 126. Bias will often be position dependent.

During a seek, the number of tracks to go is input on path 210 to a velocity profile table 212. As discussed above with reference to FIG. 2, the tracks to go is the physical distance remaining in the seek and is determined in relation to the difference between the position of the head 120 and the location of the destination track. In response, the velocity profile table 212 outputs the appropriate demand velocity $V_{DEM}$ on path 214 through, for example, interpolation techniques or from values stored in a look-up table.

The difference between the demand velocity $V_{DEM}$ and the estimated velocity $V_E$ is determined using summing junction 216. This difference, velocity error $V_{ERR}$, is passed through a notch filter 218 and is summed at summing junction 220 with an alternating current (AC) signal on path 222 indicative of current applied to the coil 114. At the same time, the destination track location is provided on input path 226 to a bias prediction block 228, which predicts an amount of bias which is summed with the estimated bias at summing junction 230. The output on path 232 is summed at the summing junction 220, as well as a second summing junction 234, to be discussed shortly.

The output of the summing junction 220 is provided to a gain block 236 having gain $K_T$, used to compensate for such effects as nonlinear torque characteristics of the VCM 116. The output is summed at summing junction 238 with a current null signal on path 240, used to null out current. The resulting signal on path 242 comprises a current command signal $I_{CMD}$ which is provided to the plant to adjust the position of the selected head 120. As mentioned above, the $I_{CMD}$ causes the coil driver circuitry of the plant 200 to apply a corresponding magnitude and polarity of current to the actuator coil 114.

In response, the plant provides a sense output on path 244 which includes servo data read from the disc 106 indicative of head position, which are provided to a demodulation (demod) block 246. The sense output on path 244 also provides an indication of current level, which is provided to summing junction 248. After demodulation, the servo data are linearized using linearization block 250 to give a position sample $X_{SAMP}$ on path 252, which is differenced at summing junction 254 with the position estimate $X_E$ to provide an observer error $O_{ERR}$ on path 256. In this manner, the operation of the observer 202 is maintained nominally that of the plant 200.

The current input to the summing junction 248 is used for saturation compensation and is accordingly summed with a saturation null input from path 258. Gain block 260 applies a saturation gain $K_{SAT}$ and the output is differenced with the bias sum from path 232. Finite response filter (FIR) 262 provides a desired time delay to the output of the notch filter 218, so that the observer 202 receives a switched input from either the FIR 262 or the saturation loop, depending upon whether the coil is in saturation.

To compare and contrast the present invention to the prior art, it will be noted that implementation of the acoustic noise generation reduction techniques of the aforementioned Hampshire U.S. Pat. No. 5,475,545 and McKenzie U.S. Pat. No. 5,657,179 references would generally involve varying the initial values of demand velocity $V_{DEM}$ output by the velocity profile table 212 at the beginning of a seek. That is, instead of calling for an initial demand velocities equal to the maximum velocity $V_{MAX}$ (as shown in FIG. 2), these references would provide initial demand velocities that incrementally increase from a low value near zero to the maximum velocity $V_{MAX}$ over initial time periods of the seek. This would result in the gradual application of current to the plant 200, reducing acoustic noise generation by reducing excitation of mechanical resonances of the plant 200.

Implementation of the aforementioned Hashimoto U.S. Pat. No. 4,965,501 reference would generally proceed with outputting from the velocity profile table 212 initial values of demand velocity $V_{DEM}$ equal to the maximum velocity $V_{MAX}$ (as shown in FIG. 2). The servo gain $K_T$ at block 236, however, would be initialized at a value near zero and would be successively incremented over initial time periods of the seek to gradually apply current to the plant 200. This would also result in a reduction of acoustic noise by the plant 200.

By contrast, the diagram of FIG. 3 additionally includes a current profile table 270, which is used during initial stages of a velocity-controlled seek to input desired open loop current command signals $I_{CMD}$ directly to the plant, irrespective of the operation of the velocity profile table 212 and the servo gain block 236. Preferred operation of the current profile table 270 can be understood with a review of FIG. 4, which provides a graphical representation of a current profile curve 280 plotted against an x-axis 282 indicative of position (tracks to go) and a y-axis 284 indicative of current magnitude. It will be understood that the curve 280 of FIG. 4 represents the initial application of current to the actuator coil 114 to begin movement of the head 120 along the acceleration portion 158 of FIG. 2. Hence, the scale of the x-axis 282 of FIG. 4 is greatly magnified with respect to the scale of the x-axis 152 of FIG. 2.

Two different acceleration current paths are shown in FIG. 4 to extend from the x-axis 282 at initial track $X_1$ and converge at point 286: a dotted line portion 288 and a solid line portion 290. The dotted line portion 288 represents the increase in current that would be applied by the circuit of FIG. 3 during initial stages of the seek based on velocity error $V_{ERR}$; that is, portion 288 represents application of maximum current to the actuator coil 114 to provide maximum acceleration to the head 120. The solid line portion 290 represents the increase in current that is applied to the actuator coil 114 as a result of the operation of the current profile table 270. While providing a decreased rate of acceleration for initial portions of the seek as compared to the portion 288, the portion 290 nevertheless provides rapid acceleration of the head 120. The particular shape of this leading current portion waveform is selected to reduce excitation of mechanical resonances in the actuator 110, thereby reducing the generation of acoustic noise during seeking.

Returning to FIG. 3, at the initiation of a seek command for a velocity controlled seek of sufficient length to reach $V_{MAX}$ (FIG. 2), the diagram preferably operates as described above to demand large amounts of current to accelerate the actuator coil 114, so that current command signals $I_{CMD}$ are presented on path 242 that would normally tend to result in a ramping of the current as described by the portion 288 in FIG. 4. However, during initial stages of the seek, switch 292 bypasses these conventionally generated $I_{CMD}$ signals, and instead connects the output of the current profile table 270 directly to the plant 200 so that the current command signals $I_{CMD}$ applied during the first several time periods of the seek are supplied by the current profile table 270 irrespective of velocity profile and servo gain. This provides an advantage of consistently applying the same leading current profile to every seek, reducing seek time variations and acoustic noise.

Table I provides an example set of relative magnitudes of current command signals $I_{CMD}$ (normalized to a maximum current magnitude of 1.0) that can be advantageously output by the current profile table 270 to effect the initial open loop acceleration of the head 120. The particular shape of the current profile should be selected based on the requirements of a given application.

TABLE I

| Seek Time Period | Current Profile Magnitude |
| --- | --- |
| 1 | 0.037 |
| 2 | 0.055 |
| 3 | 0.088 |
| 4 | 0.111 |
| 5 | 0.166 |
| 6 | 0.233 |
| 7 | 0.337 |
| 8 | 0.555 |
| 9 | 0.667 |
| 10 | 0.832 |
| 11 | 0.890 |
| 12 | 0.930 |
| 13 | 0.970 |

Because of torque variations across the VCM 116, the current profile table 270 can be provided with a base profile which is then appropriately scaled so that the same acceleration characteristics are achieved regardless of position. For example, in disc drives employing zone based recording (ZBR) techniques such as discussed in U.S. Pat. No. 4,799,112 issued to Bremmer et al., assigned to the assignee of the present invention, different torque constants can be obtained by zone and thereafter used to scale the base profile.

Returning again to FIG. 4, the current profile portion 290 eventually merges with the current portion 288 (at the point 286) so that, by the end of the application of the current profile table, the current applied by the diagram of FIG. 3 has substantially reached the maximum magnitude to be applied during the seek. If the values of the current profile table 270 are selected to correctly match the full current characteristics of portion 288, then substantially no discontinuities will occur when the switch 292 switches from the open loop current profile table 270 to the closed loop control provided on path 242.

Figure 5:
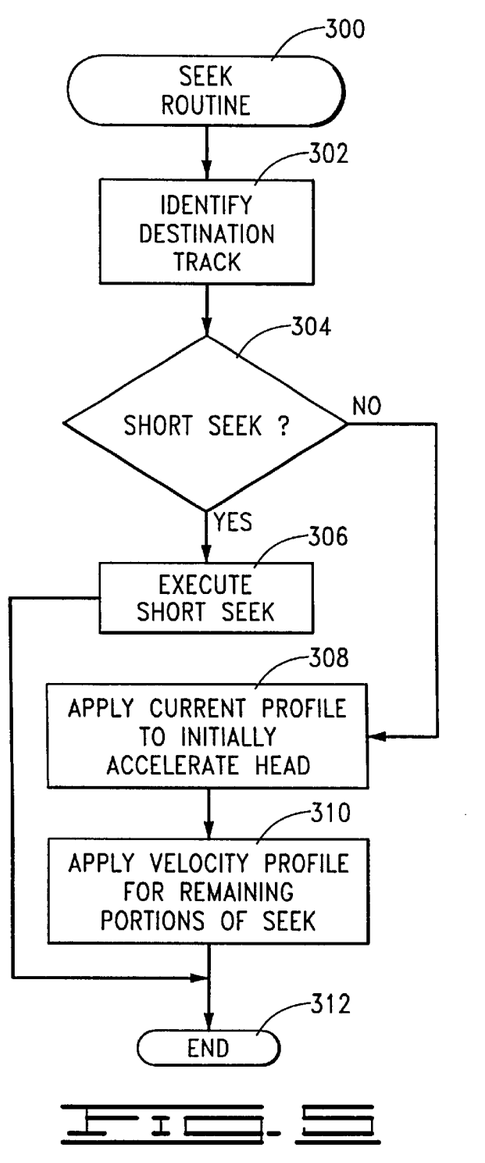
FIG. 5 is a flow chart for a SEEK ROUTINE, generally illustrating steps carried out by the servo processor in accordance with preferred embodiments of the present invention.

To summarize the foregoing discussion, FIG. 5 presents a SEEK ROUTINE 300, illustrative of steps carried out by the disc drive 100 when a seek is initiated to move a selected head from an initial to a destination track. The routine comprises programming steps primarily carried out by the servo processor.

Upon receipt of a seek command, the routine proceeds to identify the address of the destination track at step 302. The length of the seek in terms of the number of tracks to go to the destination track from the initial track is also determined at this time by subtracting the address of the destination track from the address of the existing track being followed.

From this information, the routine next determines whether the seek is a short seek, decision step 304. As the current profile table 270 has been described as preferably being used to shape the application of maximum amounts of current to the actuator coil 114, the current profile table 270 is accordingly only used on seeks where the maximum velocity $V_{MAX}$ will be reached. Accordingly, if the seek is of shorter duration, the flow will continue to step 306 wherein a short seek is executed. This short seek may comprise a velocity-controlled seek such as illustrated by acceleration portion 160 (FIG. 2), or may comprise a position-controlled seek if the number of tracks to go is relatively small (such as 100 or less).

When a large seek is required, the flow passes from the decision step 304 to step 310, where the appropriate current profile is applied directly to the plant 200 by the current profile table 270 during initial stages of the seek to initially accelerate the head 120 in a direction toward the destination track. As mentioned above, this occurs independently of the demand velocity $V_{DEM}$, actual (estimated) velocity $V_E$, velocity error $V_{ERR}$ and servo gain $K_T$. These velocity values are preferably still calculated in a parallel fashion, however, so that at the conclusion of the operation of step 308 (such as after the first 13 sample periods of the seek as illustrated by Table I), the seek switches to closed loop velocity control and the velocity profile is thereafter used to effect head positional control during remaining portions of the seek, as indicated by step 310. Once the head 120 reaches the destination track, the routine ends at step 312.

As mentioned above, it is contemplated that the circuit of FIG. 3 will switch from open loop operation using the current profile table 270 to closed loop operation using the velocity control-loop (i.e., current commands based on the magnitude of velocity error $V_{ERR}$) at the conclusion of the sequence of current commands from the current profile table 270. In an alternative embodiment, the current profile table 270 is provided a sense capability to monitor the operation of the velocity-control loop and converge final output values from the table 270 to provide improved transition to the closed loop.

This configuration is represented in FIG. 3 by the connection of the output of the summing junction 220 to the current profile table 270, although other connection configurations can be readily employed as desired. In this way, once the current profile table 270 has output all of the open loop $I_{CMD}$ values from the desired profile (such as the 13 normalized values shown in Table I, for example), the current profile table 270 will continue to output additional open loop $I_{CMD}$ values until the difference between the open loop $I_{CMD}$ value from the table 270 and the closed loop $I_{CMD}$ value generated by the velocity control loop (i.e., the value on the path 242) falls within a specified threshold. The table 270 can be configured to continue to increment the final $I_{CMD}$ value by a selected amount until this occurs. Once converged, the circuit will switch to the velocity control loop, as before, for the remainder of the seek.

Figure 6:
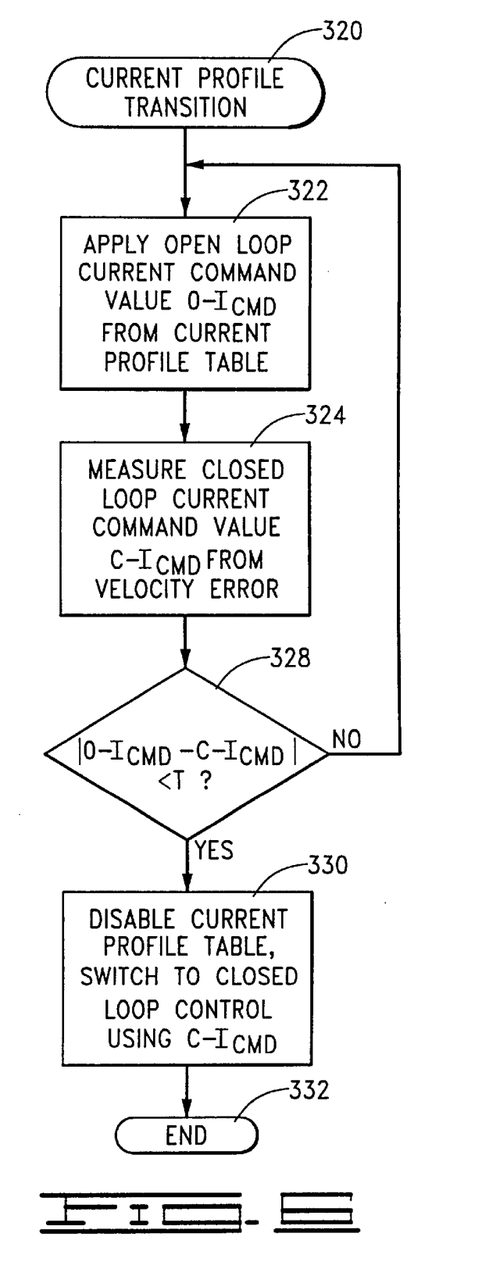
FIG. 6 is a flow chart for a CURRENT PROFILE TRANSITION routine, generally illustrating additional steps carried out by the servo processor in conjunction with the routine of FIG. 5 in accordance with preferred embodiments of the present invention.

This alternative operation is illustrated by FIG. 6, which presents a CURRENT PROFILE TRANSITION routine 320, which is contemplated as describing steps that are carried out to control the transition between the operation of steps 308 and 310 in the routine of FIG. 5.

As shown in FIG. 6 at step 322, initial acceleration of the head 120 is carried out by the open loop current command values (designated as "O-$I_{CMD}$") from the current profile table 270, which as discussed above occurs irrespective of the demand velocity, the actual (estimated) velocity and the velocity error $V_{ERR}$ therebetween. At the same time, a closed loop current command value (designated as "C-$I_{CMD}$") is determined for each of the time periods of the seek, step 324. It will be recognized that the difference between the O-$I_{CMD}$ and the C-$I_{CMD}$ values can be generally represented by an area 326 between curve portions 288 and 290 in FIG. 4, and this difference will eventually converge to a value of zero at the point 286 in FIG. 4.

Hence, the current profile table 270 operates to calculate and compare this difference to a convergence threshold T, as indicated by decision step 326 in FIG. 6. When the difference is greater than the threshold T, the routine returns to step 322 where a new open loop current command value O-$I_{CMD}$ is applied to the plant 200 and a new difference is calculated. The routine continues in like manner until the difference is less than the threshold, after which the flow continues to step 330 where the current profile table is disabled and the circuit of FIG. 3 switches to closed loop control using the closed loop current command values C-$I_{CMD}$ formed in relation to the velocity error $V_{ERR}$.

In summary, the present invention is directed to an apparatus and method for reducing the generation of acoustic noise during a disc drive seek operation.

In accordance with preferred embodiments, a disc drive 100 has a head 120 controllably positionable adjacent tracks on a rotatable disc 106 using a voice coil motor 116. A seek is carried out to move the head from an initial track to a destination track on a corresponding disc surface using a servo circuit which outputs a series of current command values indicative of successive magnitudes of current to be applied to the VCM.

A velocity profile 150 provides a sequence of demand velocities indicative of the desired velocity at each of a succession of time periods during the seek. Closed loop velocity control is achieved by comparing the actual velocity of the head to the corresponding demand velocity and adjusting the current in relation to the velocity error therebetween.

During initial stages of the seek, however, open loop control is initially performed using a current profile table which shapes the initial stages of current to a desired waveform, irrespective of the velocity profile and the velocity error. The waveform is selected to reduce excitation of mechanical resonances in the disc drive.

For purposes of the appended claims, the phrase The terms "circuit" and "circuitry" will be understood to be realizable in hardware or firmware/ programming. Method steps have been individually labeled for convenience, but are not necessarily limited to the order shown.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for carrying out a seek in a disc drive by moving a head from an initial track to a destination track on a corresponding disc using a servo circuit which outputs a series of current command values indicative of successive magnitudes of current to be applied to an actuator motor coupled to the head, comprising steps of:

(a) providing a velocity profile having a maximum velocity to which the head is accelerated and a deceleration portion along which the head is decelerated to the destination track, the velocity profile comprising a series of demand velocities indicative of the desired velocity of the head at each of a succession of time periods;

(b) providing a current profile of open loop current command values indicative of successive magnitudes of current to be applied to the actuator motor during a subset of initial time periods of the seek;

(c) obtaining closed loop current command values each determined in relation to a velocity error comprising a difference between an actual velocity of the head and the associated demand velocity;

(d) outputting the open loop current command values to apply current to the actuator motor to initially accelerate the head away from the initial track irrespective of the actual velocity, the demand velocity and the velocity error; and (e) subsequently outputting closed loop current command values determined in relation to the actual velocity, the demand velocity and the velocity error, the closed loop current command values causing the head to nominally follow the velocity profile.

2. The method of claim 1, wherein the subsequently outputting step (e) further comprises a step of switching from the open loop current command values to the closed loop current command values when a difference between the closed loop current command value and the open loop current command value at a selected time period is less than a selected threshold.

3. The method of claim 1, wherein the obtaining step (c) comprises steps of:
   (c1) arranging tracks on the disc into a plurality of concentric zones;
   (c2) associating a set of open loop current command values with each zone selected in relation to torque characteristics of the actuator motor when the head is disposed over each zone; and
   (c3) selecting the set of open loop current command values associated with the zone in which the initial track is disposed.

4. In a method for carrying out a seek in a disc drive to move a head from an initial track to a destination track on a corresponding disc by applying current to a coil of an actuator motor coupled to the head, comprising steps of:
   (a) providing a velocity profile of demand velocities indicative of a desired trajectory as the head is initially accelerated to a maximum velocity and subsequently decelerated to the destination track;
   (b) determining an actual velocity of the head at each of a succession of time periods during the seek;
   (c) calculating a velocity error of the head at each of the succession of time periods in relation to a difference between the actual velocity and the associated demand velocity from the velocity profile; and
   (d) generating a series of closed loop current command values in relation to the velocity error at each of the succession of time periods, the closed loop current command values used to control magnitude of current applied to the coil so that the head nominally follows the desired trajectory defined by the velocity profile;
the improvement characterized as the method further comprising steps of:
   (e) providing a current profile of open loop current command values indicative of successive magnitudes of current to be applied to the coil during a subset of initial time periods of the seek irrespective of the velocity error at the initial time periods; and
   (f) using the open loop current command values to control the magnitude of current applied to the coil to initially accelerate the head away from the initial track.

5. The improvement of claim 4, wherein the open loop current command values of the providing step (e) are selected in relation to location of the initial track to account for variations in torque characteristics of the actuator motor, so that the coil undergoes nominally the same acceleration irrespective of location of the initial track.

6. The improvement of claim 4, further comprising steps of:
   (g) monitoring the closed loop current command values from the generating step (d) while the open loop current command values are applied during the using step (f); and
   (h) switching from the open loop current command values to the closed loop current command values when a difference between the closed loop current command value and the open loop current command value at a selected time period is less than a selected threshold.

7. A disc drive, comprising:
   a rotatable disc with a recording surface on which a plurality of tracks are defined;
   an actuator which supports a head adjacent the tracks;
   an actuator motor coupled to the actuator which moves the heads across the recording surface, the actuator motor comprising a coil; and
   a servo circuit, operably coupled to the head and the coil, which applies current to the coil to perform a seek operation wherein the head is moved from an initial track to a destination track by accelerating the head to a maximum velocity and subsequently decelerating the head to the destination track in accordance with a velocity profile defining a desired trajectory of the head, wherein the servo circuit carries out the seek by initially applying current to the coil in relation to a series of open loop current command values selected independently of the velocity profile, after which the servo circuit transitions to applying current to the coil in relation to a series of closed loop current command values selected in relation to a velocity error determined as a difference between the velocity profile and the actual velocity of the head.

8. The disc drive of claim 7, wherein the open loop current command values are selected in relation to radial position of the initial track to compensate for variations in torque characteristics of the actuator motor, so that the open loop current command values result in a nominally identical current profile being applied to the coil at the beginning of a seek irrespective of the radial position of the initial track.

9. In a data storage device having a data transducing head controllably positionable adjacent tracks defined on a recording surface through application of current to an actuator motor, a method for carrying out a seek to move the head from an initial track to a destination track comprising steps of:
   (a) providing a current profile table of open loop current command values indicative of successive magnitudes of current to be applied to the actuator motor during initial acceleration of the head irrespective of actual velocity of the head;
   (b) using the open loop current command values to initially accelerate the head away from the initial track; and
   (c) subsequently using closed loop current command values to continue acceleration of the head away from the initial track, said closed loop current command values determined in relation to the actual velocity of the head and a velocity profile indicative of a desired trajectory of the head during the seek.

10. The method of claim 9, wherein the current profile table comprises a plurality of open loop current command values of successively increasing magnitude.

11. The method of claim 9, wherein the open loop current command values of the current profile table are selected to reduce excitation of mechanical resonances in the disc drive during acceleration of the head.

12. The method of claim 9, wherein step (b) further comprises a step of concurrently generating closed loop current command values during use of the open loop current command values, said concurrently generated current command values determined in relation to the actual velocity of the head and the velocity profile.

13. The method of claim 12, wherein step (b) further comprises repetitively applying the last open loop current command value in the current profile table until a difference between a magnitude of the last open current command value and a magnitude of the corresponding concurrently generated closed loop current command value is less than a selected threshold.

14. A disc drive, comprising:
 a controllably positionable head adjacent a rotatable disc on which a plurality of tracks are defined;
 an actuator motor coupled to the head; and
 means for positioning the head by seeking from an initial track to a destination track on the disc by providing an initial current profile to the actuator motor to initially accelerate the head, the initial current profile determined irrespective of velocity error during the seek, and by subsequently providing current to the actuator motor in relation to the velocity error of the head during the seek so that the head follows a trajectory defined by a velocity profile.

* * * * *